(No Model.)
J. WAGNER.
HARNESS LOOP CLAMP.
No. 312,679. Patented Feb. 24, 1885.
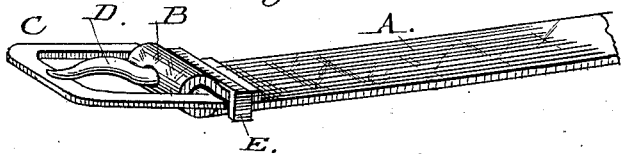
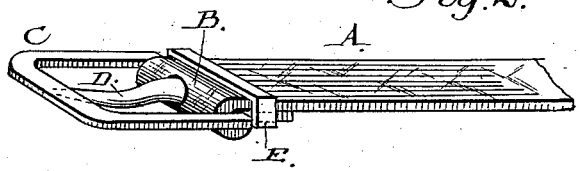
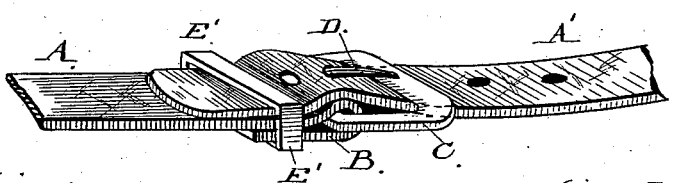
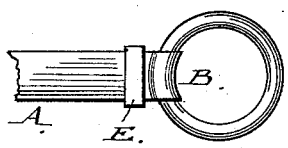 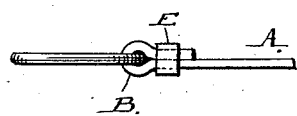
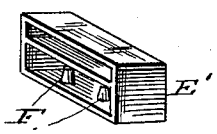 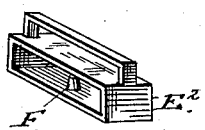 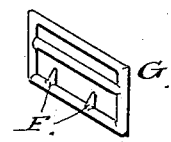
 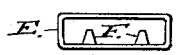 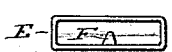 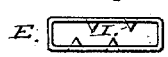
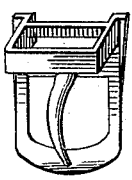
Attest:
T. Walter Fowler
Daniel Clark
Inventor
Julius Wagner;
by his atty
Thomas P. Kinsey

UNITED STATES PATENT OFFICE.

JULIUS WAGNER, OF READING, PENNSYLVANIA.

HARNESS-LOOP CLAMP.

SPECIFICATION forming part of Letters Patent No. 312,679, dated February 24, 1885.

Application filed December 5, 1884. (No model.)

*To all whom it may concern:*

Be it known that I, JULIUS WAGNER, a citizen of the United States, residing at the city of Reading, county of Berks, State of Pennsylvania, have invented a new and useful Improvement in Harness-Loop Clamps, of which the following is a specification.

This improvement, although applicable to other purposes, is more particularly related to the various styles of harness in the market.

The object of the improvement is to simplify the construction of harness, to save material in manufacturing the same, and to enable farmers and drivers generally to be independent of saddlers in case of accident to harness, &c.

The accompanying drawings show very fully the improvement and its mode of attachment, like letters designating like parts throughout.

Figure 1 represents a top view of a strap and buckle, with the buckle-loop held in place by the clamp. Fig. 2 represents the reverse face of the same strap. Fig. 3 shows a clamp provided with a box-retainer for the end of the strap passed through the buckle. Fig. 4 shows the application of the improvement to a ring attachment, and Fig. 5 is a side or edge view of the same. Figs. 6 and 7 represent clamps of box form provided with retainer-boxes for strap ends, and Fig. 8 shows a clamp of the same class made exclusively of wire. Figs. 9, 10, 11, and 12 show different modes of constructing the clamp. Fig. 13 represents an alternative form, in which I reserve my rights.

A represents the strap to which the buckle, ring, or equivalent article is to be secured; A' the opposite or free end of the same or any other strap. B shows the loop of the strap surrounding the bar of the buckle or a portion of the ring. C is the buckle; D, its tongue; E, clamp of plain box form; E', clamp with a box-retainer; F, studs on lower internal face of clamp; G, double clamp of wire; H, serrations, and I punched projections within the clamp.

The construction of the clamp is readily seen in the drawings, and they may be cast in any of the metals suitable therefor, or be stamped out under a drop-press; may be japaned, bronzed, or nickle-plated, to adapt them to harness of every character, and with plain or embossed surfaces.

To attach a buckle, holes are first provided at a short distance from the end of the strap to receive the studs F, and at the proper distance therefrom an oblong hole for the tongue of the buckle. The tongue is inserted in the strap, and the studs in the clamp placed in the holes provided for the same. The free end of the strap is then passed through the buckle-frame, and returned toward and passed through the clamp upon the short end of the strap therein, and drawing it tightly against the buckle-bar the loop is locked solidly in place, and the greater the pull upon the strap the tighter the joint that is made. A reversal of the operation will release the strap when it is desirable to make changes in the length of the same.

The attachment of buckles, rings, &c., may be made indifferently, to have the short end show upon the front or inside of the harness. By throwing the same upon the outside it leaves the inner face of the straps free from chafing projections, which in stitched harness often causes much annoyance.

Harness generally is made up of straps of leather or suitable material held movably together by a system of loops, buckles, &c., so that it may be readily adjusted to animals of varying sizes. The buckles and rings, when used, are usually held in a double loop or thickness of the material, and to retain the same are stitched together from two to four or more inches back of the attachment. With my improvement this labor is dispensed with, and all material over one-half inch in length for the lap back of the buckle, ring, &c., is saved, as I require only sufficient length in the return or lap ends of the straps to permit the studs F to lock in the end of the same when the clamp is in position, as shown in the drawings. This simple and secure mode of attaching buckles, rings, snaps, &c., makes it a great convenience to the farmer in the field or drivers generally. Should an attachment give way, instead of going to the harness-makers the clamp gives a ready relief.

I do not confine myself to single-width clamps, as frequently double widths would be desirable. Should a leather trace break square off, there is usually no spare length left for repairs. Provided with double-width clamps having its studs F at opposite ends and upon the opposite inner faces of the same, we open the stitching back a short distance each side of the break, and punching each released half-thickness to suit its appropriate studs they are inserted within the clamp. The free piece of each is then bent and forced within the clamp, which completes the job, and the clamp being struck upon its face to close it the trace will be ready for service.

Express and package carriers can readily prepare their own straps for any sized trunks, bundles, &c., and great economy will be obtained in labor and material by the use of the improvement.

The studs F are usually made of a height not quite that of the thickness of strap to which the clamp is to be adapted. For narrow widths of straps one stud is sufficient. More may be added as the width is increased. In place of studs and the punching of holes for their insertion, the face intended to contact with the short end of the strap may be roughened or serrated, to give the necessary grip upon the same; or the surface may be smooth, and after the strap is in place a punch provided with appropriate devices being placed upon the clamp and struck would impress a portion of the clamp into the material of the strap, and thus secure the same.

I am aware that I am not the first to provide a mode of securing a buckle, ring, or snap in a harness-loop without stitching the same in place; but all provisions of this kind with which I am conversant are cumbersome or complicated in character, and save very little material and labor over the usual stitched harness.

Having described my invention, shown its construction and adaptation to harness, I desire to secure by Letters Patent the following claim thereon:

As an improvement in the construction of harness and the attachment of buckles, rings, &c., thereto, a clamp of suitable form, as shown, provided with one or more studs integral therewith upon its interior face whose length is equal to one-half the height of the inclosed space, in combination with said harness or portions thereof, whereby attachment therewith may be made and broken without change of form, substantially as and for the purpose set forth.

JULIUS WAGNER.

Witnesses:
THOMAS P. KINSEY,
F. PIERCE HUMMEL.